(12) United States Patent
Baric

(10) Patent No.: US 11,975,333 B1
(45) Date of Patent: May 7, 2024

(54) MODULAR STACKABLE WEAR-RESISTANT PANEL SYSTEM

(71) Applicant: FLSmidth A/S, Valby (DK)

(72) Inventor: Zdenko (Danny) Baric, Mount Pleasant (AU)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 18/032,165

(22) PCT Filed: Oct. 14, 2021

(86) PCT No.: PCT/IB2021/059444
§ 371 (c)(1),
(2) Date: Jun. 8, 2023

(87) PCT Pub. No.: WO2022/079650
PCT Pub. Date: Apr. 21, 2022

Related U.S. Application Data

(60) Provisional application No. 63/091,878, filed on Oct. 14, 2020.

(51) Int. Cl.
*B32B 3/24* (2006.01)
*B02C 13/282* (2006.01)
(Continued)

(52) U.S. Cl.
CPC ............ *B02C 13/282* (2013.01); *B32B 3/266* (2013.01); *B32B 3/30* (2013.01); *B02C 2013/2825* (2013.01); *B32B 7/08* (2013.01)

(58) Field of Classification Search
CPC .................. B65G 11/16; B02C 13/282; B02C 2013/2825
See application file for complete search history.

(56) References Cited

U.S. PATENT DOCUMENTS

| 4,319,719 A | 3/1982 | Larsen |
| 4,946,110 A * | 8/1990 | Harris ..................... B02C 17/22 241/300 |
| 2017/0355526 A1 | 12/2017 | Baric et al. |

FOREIGN PATENT DOCUMENTS

| WO | 8604267 A1 | 7/1986 |
| WO | 2007063554 A1 | 6/2007 |
| WO | 2016060877 A1 | 4/2016 |

OTHER PUBLICATIONS

The International Search Report and Written Opinion dated Jan. 6, 2022, 15 pages. The positive International Preliminary Report on Patentability dated Jan. 26, 2023, 13 pages.

* cited by examiner

*Primary Examiner* — William P Watkins, III
(74) *Attorney, Agent, or Firm* — Jeffrey A. Sharp

(57) ABSTRACT

A stackable wear panel (1) for use within a modular stackable wear-resistant panel system (11) is configured to be removably affixed to a wall (10A) or surface of equipment (10) to be protected. The stackable wear panel (1) is also configured to be alternatively removably affixed to a top surface (2A) of another stackable wear panel (1) within a stacked wear panel arrangement (1', 1"). The stackable wear panel (1) is formed by a matrix (2) having a top surface (2A), a bottom surface (2B) opposite said top surface (2) and a central bore (4) extending through the top (2A) and bottom (2B) surfaces. The central bore (4) is configured to receive either one of a fastener (5) or a spacing adapter (6) therein, and/or support a portion (5A, 5B) of the fastener (5) or a lower outer surface portion (6E) of the spacing adapter (6).

11 Claims, 12 Drawing Sheets

(51) Int. Cl.
*B32B 3/26* (2006.01)
*B32B 3/30* (2006.01)
*B32B 7/08* (2019.01)

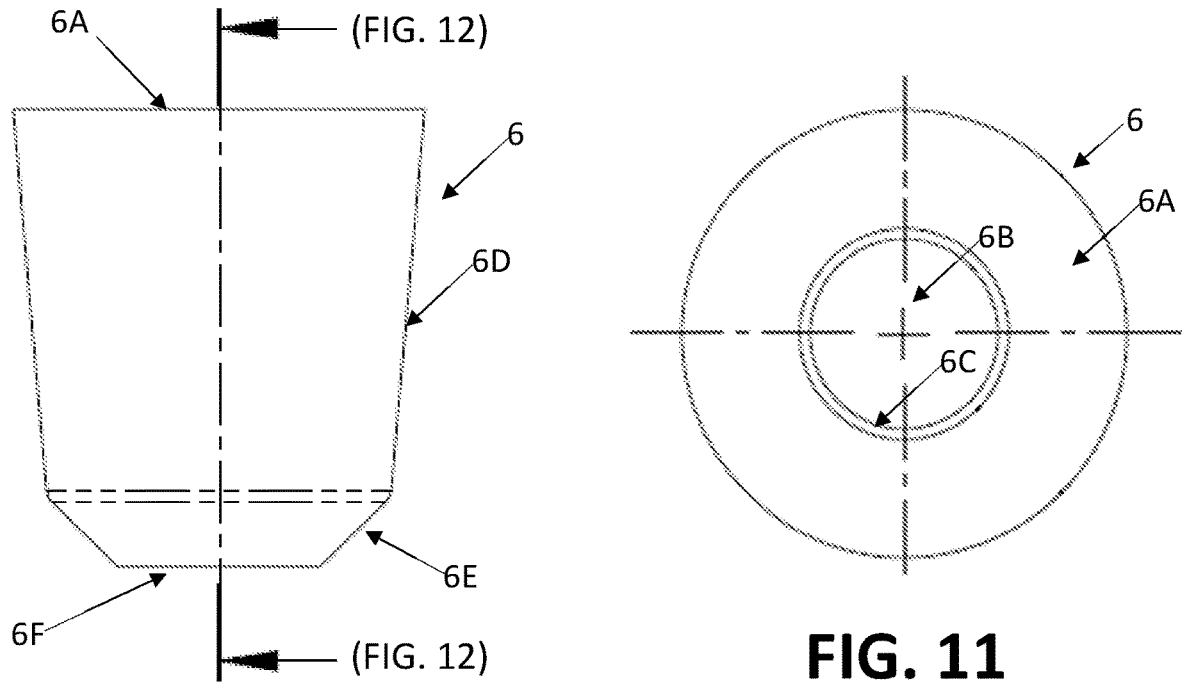
FIG. 10
FIG. 11
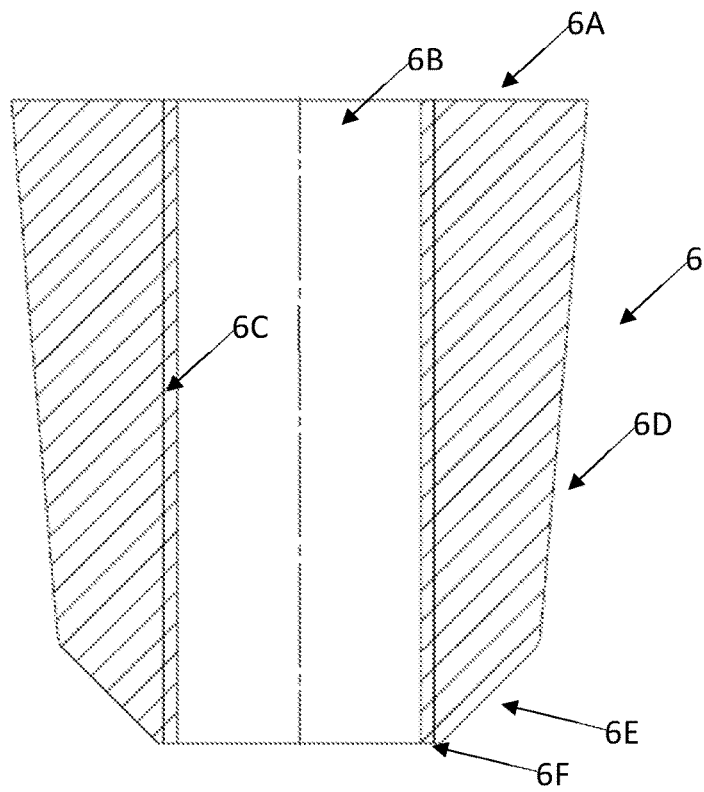
FIG. 12

MODULAR STACKABLE WEAR-RESISTANT PANEL SYSTEM

FIELD OF THE INVENTION

The present invention relates to a modular stackable wear-resistant panel system 11. The modular stackable wear-resistant panel system comprises a number of stackable wear panels 1. Each wear panel 1 is suitable for use as a portion of a liner in or impact pad below materials handling equipment 10 including, but not limited to chutes, hoppers, bins, tanks, separator devices, fan housings, and the like.

In particular, the present invention relates, but is not limited to, an improved wear panel 1 having a matrix 2 of a wear-resistant material and a centrally-disposed bore 4 configured to equally receive a fastener 5 and/or a stacking adapter 6 provided within the modular stackable wear-resistant panel system 11.

In some embodiments, the matrix 2 may be solid. The matrix 2 may optionally comprise one or more cavities 3, 7 to reduce weight and cost of the wear panel 1. A polymer, such as a urethane, without limitation, may be optionally disposed within said one or more cavities 3, 7. The one or more cavities 3, 7 may comprise a number of through cavities 3 and/or blind cavities 7, without limitation.

BACKGROUND TO THE INVENTION

Reference to background art herein is not to be construed as an admission that such art constitutes common general knowledge in the arts.

Wear panels are typically used in the minerals, mining, foundry, milling and materials handling industries in order to increase the life of equipment, decrease maintenance downtime and increase throughput. Such panels are typically secured to the floor and walls of chutes, hoppers, bins, tanks, separator devices, fan housings and other equipment where abrasive or corrosive material would cause rapid wear in order to provide an area of cover or liner in sliding contact with materials such as crushed rock, coal, ore, grain and other abrasive aggregates.

There are an existing range of wear panels, for example those disclosed in e.g. U.S. Pat. Nos. 4,307,140; 4,319,719; 5,055,336; 5,705,250; 6,129,967 and 8,039,075—as well as publication Nos. WO2006/060877, WO2007/063554, WO86/04267, US2017/355526. However, such panels have drawbacks in that they are e.g. expensive to manufacture, require speciali2ed tooling to fabricate and assemble, require the use of screws, anchors, adhesives or rubber substrates to bond side portions of the wear panels together, are difficult to cut and assemble on site, require long-lead times and typically experience delamination and cracking. By way of example, ceramic wear members have been used in wear panels. However, when ceramic edges are exposed to wear, the edges easily chip. In addition, when the ceramic wear members are encapsulated in polyurethane or rubber, delamination can occur; when using e.g. a hot moulding rubber process, thermal shock can damage the ceramic or other wear members and create a less preferable product; and a hot casting off-site facility is typically required for manufacture and assembly which can increase cost and lead-times. Bonding ceramic to other wear materials can be complicated and unreliable. Further, the use of screws and anchors in order to attach wear members can create weaknesses in the members causing cracking, are more expensive to manufacture, require tooling and are difficult to assemble on site. Additionally, when wear panels are assembled off site and delivered to a customer site in whole, if dimensional or figuration changes must be made, such wear panels are difficult to cut and burdensome to manoeuvre.

To overcome the aforementioned problems associated with prior art devices, the Applicant and inventor of the present invention has recently developed FerroCer® impact wear panel technology (described in U.S. Patent No. 10,543,985). The present invention aims to expand upon the FerroCer® technology and current product line for increased flexibility, application breadth, functionality, and modularity.

Objects of the Invention

It is an aim of this invention to provide an improved wear panel system which overcomes or ameliorates one or more of the disadvantages or problems described above, or which at least provides a useful alternative.

A particular aim of embodiments is to provide a wear panel system which allows stacking of wear panels 1 in at least two directions (i.e., vertically/perpendicular in relation to a mounting surface of a wall 10A and laterally with respect to adjacently-positioned wear panels 1), thus providing an option for users to provide additional wear protection in certain areas 9 of equipment 10 which may be subject to greater wear than other areas 8 of equipment 10 which may be subject to lesser wear.

It is a further aim of embodiments to enable utilization of a single bolt 5 to mount a plurality of stacked wear panel matrices 2 to a wall 10A of equipment 10, such that the structural integrity of the mounting of the plurality of stacked wear panel matrices 2 is not compromised upon erosion of the head 5A of the bolt.

It is a further aim of embodiments to utilize a single bolt 5 to mount a plurality of stacked wear panel matrices 2, such that the plurality of stacked wear panel matrices 2 do not become loose or dislodged from a wall 10A of equipment upon erosion of the head 5A of the bolt.

It is a further aim of embodiments to provide a system wherein a wall 10A of equipment 10 may be infinitely configurable with different thicknesses of wear protection in different areas 8, 9 of equipment 10, without limitation.

It is a further aim of embodiments to provide a system wherein wear protection can be customized based on predicted wear and/or customer preference.

It is a further aim of embodiments to provide a wear liner/wear protection system wherein maintenance intervals can be extended and/or maintenance downtimes optimized and minimized, without limitation.

It is a further aim of embodiments to provide a greener, more environmentally conscious wear liner/wear protection system wherein scrap material losses are minimized.

It is a further aim of embodiments to provide a wear liner/wear protection system which offers robust ergonomics and cost effectiveness for end users within a broad scope of applications and equipment 10.

Other preferred objects of the present invention will become apparent from the following description.

SUMMARY OF INVENTION

According to embodiments of the invention, a stackable wear panel (1) may be provided. The stackable wear panel (1) may be configured for use within a modular stackable wear-resistant panel system (11). The stackable wear panel (1) may be configured to be removably affixed to a wall (10A) or surface of equipment (10) to be protected—and may also configured to be alternatively removably affixed to a top surface (2A) of another stackable wear panel (1) within a stacked wear panel arrangement (1', 1"). The stackable wear panel (1) may comprise a matrix (2) having a top surface (2A), a bottom surface (2B) opposite said top surface (2). The matrix (2) may comprise a central bore (4) extending through the top (2A) and bottom (2B) surfaces. The central bore (4) may receive a fastener (5) or a spacing adapter (6) therein. The central bore (4) may be configured to support a portion (5A, 5B) of the fastener (5) or a lower outer surface portion (6E) of the spacing adapter (6), without limitation.

According to some embodiments, the fastener (5) may comprise a bolt (5) having a head (5A). The central bore (4) of the matrix (2) may be configured to support a lower head surface (5B) provided beneath the head (5A), without limitation.

According to some embodiments, the lower outer surface portion (6E) of the spacing adapter (6) may comprise a tapered surface, a rounded surface, or a chamfer. The tapered surface, rounded surface, or chamfer may be advantageously configured to bias the spacing adapter (6) into coaxial alignment with the central bore (4), without limitation.

In some embodiments, the stackable wear panel (1) may be part of a stacked wear panel arrangement (1', 1"). The stacked wear panel arrangement (1', 1") may, for example, comprise a dual-stacked wear panel (1') assembly or a tri-stacked (1") wear panel assembly, without limitation.

For example, a stacked wear panel arrangement (1', 1") in accordance with embodiments may comprise a first matrix (2) and a second matrix (2). The first matrix (2) may be configured to be removably affixed to the wall (10A) or surface of equipment (10) to be protected. The first matrix (2) may comprise a first central bore (4) having a spacing adapter (6) disposed therein. A bottom surface (2B) of the second matrix (2) may be positioned against a top surface (2A) of the first matrix (2). The second matrix (2) may comprise a second central bore (4) having a head (5A) of the fastener (5) therein. The first and second matrices (2) may be identical to each other.

In some embodiments, the spacing adapter (6) may comprise an aperture (6b) comprising an inner thread (6C), the inner thread (6C) being configured for threaded engagement with an outer threaded shaft (6C) of the fastener (5), without limitation. The fastener (5) may be configured for threaded engagement with a nut (5E), for example, a nut (5E) provided to a back side of the wall (10A) or surface, without limitation.

In some embodiments, the matrix (2) may comprise a number of cavities (3, 7), without limitation. According to some embodiments, the number of cavities (3, 7) may comprise a number of through-cavities (3) extending through the top surface (2A) and the bottom surface (2B) of the matrix (2), without limitation. The number of through-cavities (3) may be one or more than one (i.e., a plurality), without limitation.

In some embodiments, the number of cavities (3, 7) may comprise a number of blind-cavities (7, 7A, 7B) extending into the top surface (2A) of the matrix and/or bottom surface (2B) of the matrix (2), without limitation. The number of through-cavities (3) may be one or more than one (i.e., a plurality), without limitation.

In some embodiments, the number of cavities (3, 7) may comprise a taper (3A, 3B), without limitation. In some embodiments, the number of cavities (3, 7, 7A, 7B) comprise or are filled with a polymer, without limitation. In some embodiments, the polymer may comprise urethane or a hard rubber (e.g., polyurethane), without limitation.

Also disclosed, is a method of installing a stackable wear panel (1) onto a wall (10A) or surface of a piece of equipment (10), wherein the stackable wear panel (1) is part of a modular stackable wear-resistant panel system (11).

According to some embodiments, the method may comprise the step of providing a matrix (2) as previously-described above. The method may further comprise the step of inserting the fastener (5) through the central bore (4) of the matrix (2). The method may further comprise the step of supporting the fastener (5) within the central bore (4) such that the portion of the fastener (5) engages a surface portion of the central bore (4). The method may further comprise the step of preventing further passage of the fastener (5) beyond the lower surface (2B) of the matrix (2) using the central bore (4). The method may further comprise the step of applying a nut (5E) to an outer threaded shaft (5C) of the fastener (5). The outer threaded shaft (5C) may be fully threaded. The method may further comprise the step of securing the matrix (2) against relative movement with respect to the wall (10A) or surface of a piece of equipment (10) by virtue of tightening the nut (5E) in relation to the outer threaded shaft (5C) of the fastener (5).

In some embodiments, it may be desired to provide extra wear protection (i.e., a dual-stacked wear panel (1') arrangement) to certain locations of the wall (10A) or surface of a piece of equipment (10). In such embodiments, the method may further comprise the steps of providing a second identical matrix (2), arranging said second identical matrix (2) below the matrix (2), such that the bottom surface (2B) of the matrix (2) is in close proximity with the top surface (2A) of the second identical matrix (2); providing a spacing adapter (6) as previously-described above within the central bore (4) of the second identical matrix (2), the spacing adapter (6) having an aperture (6B) outfitted with an inner thread (6C); and; engaging the inner thread (6C) with the outer threaded shaft (5C) of the fastener (5) prior to the step of applying a nut (5E) to an outer threaded shaft (5C) of the fastener (5).

In some embodiments, it may be desired to provide even further wear protection (i.e., a tri-stacked wear panel (1") arrangement) to certain locations of the wall (10A) or surface of a piece of equipment (10). In such embodiments, the method may further comprise the steps of: providing a third identical matrix (2) as previously-described above; arranging said third identical matrix (2) below or above the second identical matrix (2) such that the bottom surface (2B) of the second identical matrix (2) is in close proximity with the top surface (2A) of the third identical matrix (2)—or, such that the bottom surface (2B) of the third identical matrix (2) is in close proximity with the top surface (2A) of the second identical matrix (2); providing another spacing adapter (6) which is identical to the spacing adapter (6) provided to the second identical matrix (2) within the central bore (4) of the third identical matrix (2); and; engaging the inner thread (6C) of the another spacing adapter (6) with the outer threaded shaft (5C) of the fastener (5) prior to the step of applying a nut (5E) to an outer threaded shaft (5C) of the fastener (5).

A modular stackable wear-resistant panel system (11) is further disclosed. The modular stackable wear-resistant panel system (11) may comprise: a plurality of the matrix (2) as previously-defined above; a plurality of the spacing adapter (6) as previously-defined above; and a plurality of the fastener (5) as previously-defined above. The modular stackable wear-resistant panel (11) system may be configured such that a single one of the plurality of matrix (2) may be secured to the wall (10A) or surface of a piece of equipment (10) via a single one of the plurality of fastener (5). The modular stackable wear-resistant panel system (11) may be configured such that two of the plurality of matrix (2) may be secured to the wall (10A) or surface of a piece of equipment (10) via the single one of the plurality of fastener (5) and a single one of the plurality of spacing adapter (6). The modular stackable wear-resistant panel system (11) may be configured such that three of the plurality of matrix (2) may be secured to the wall (10A) or surface of a piece of equipment (10) via the single one of said plurality of fastener (5) and two of the plurality of spacing adapter (6). As suggested in FIG. 19, the plurality of fastener (5) may comprise bolts having outer threaded shafts (5C) of different lengths.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures.

FIG. 1 shows an area 9 prone to high wear concentration and areas 8 with less wear concentration superimposed onto a new prior art wear panel system installed on equipment 10. FIG. 2 shows a worn wear panel from FIG. 1, wherein the entire wear panel must be scrapped, despite a large portion of the wear panel in area 8 remaining fit for service. In remote regions of the world, it may be cost-prohibitive to transport such large and heavy worn wear panels to recyclers. This increases total carbon footprint and overall operational expenditures (OPEX).

FIGS. 10-12 show side plan view, top plan view, and side cross-sectional views of a spacing adapter 6, respectively, according to non-limiting embodiments of the invention.

DETAILED DESCRIPTION OF THE DRAWINGS

FIGS. 3-18 illustrate embodiments of a modular stackable wear-resistant panel system 11 of the present invention.

Figure 3:
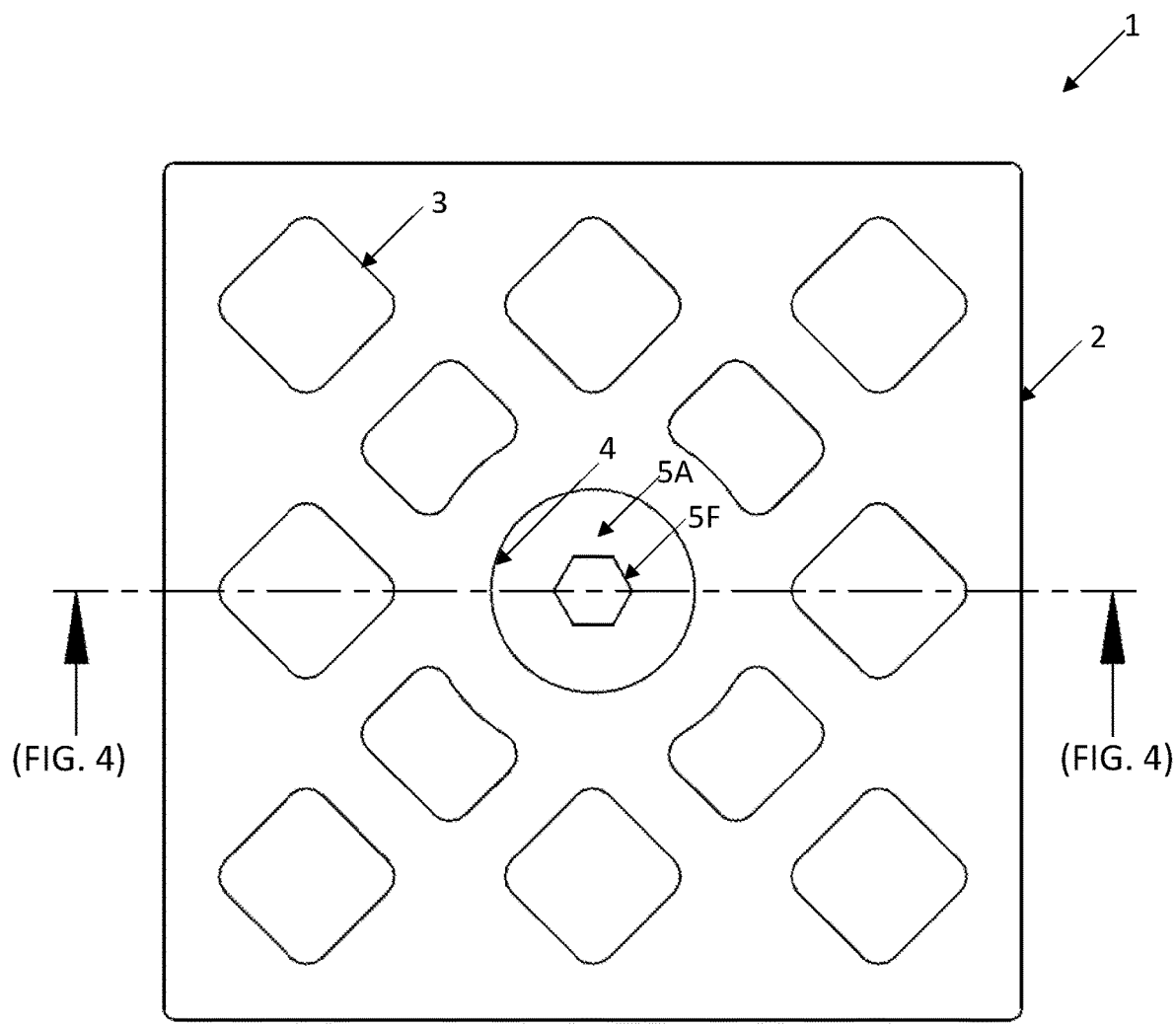
FIG. 3 is a top plan view of a wear panel 1 according to non-limiting embodiments of the invention.
Figure 4:
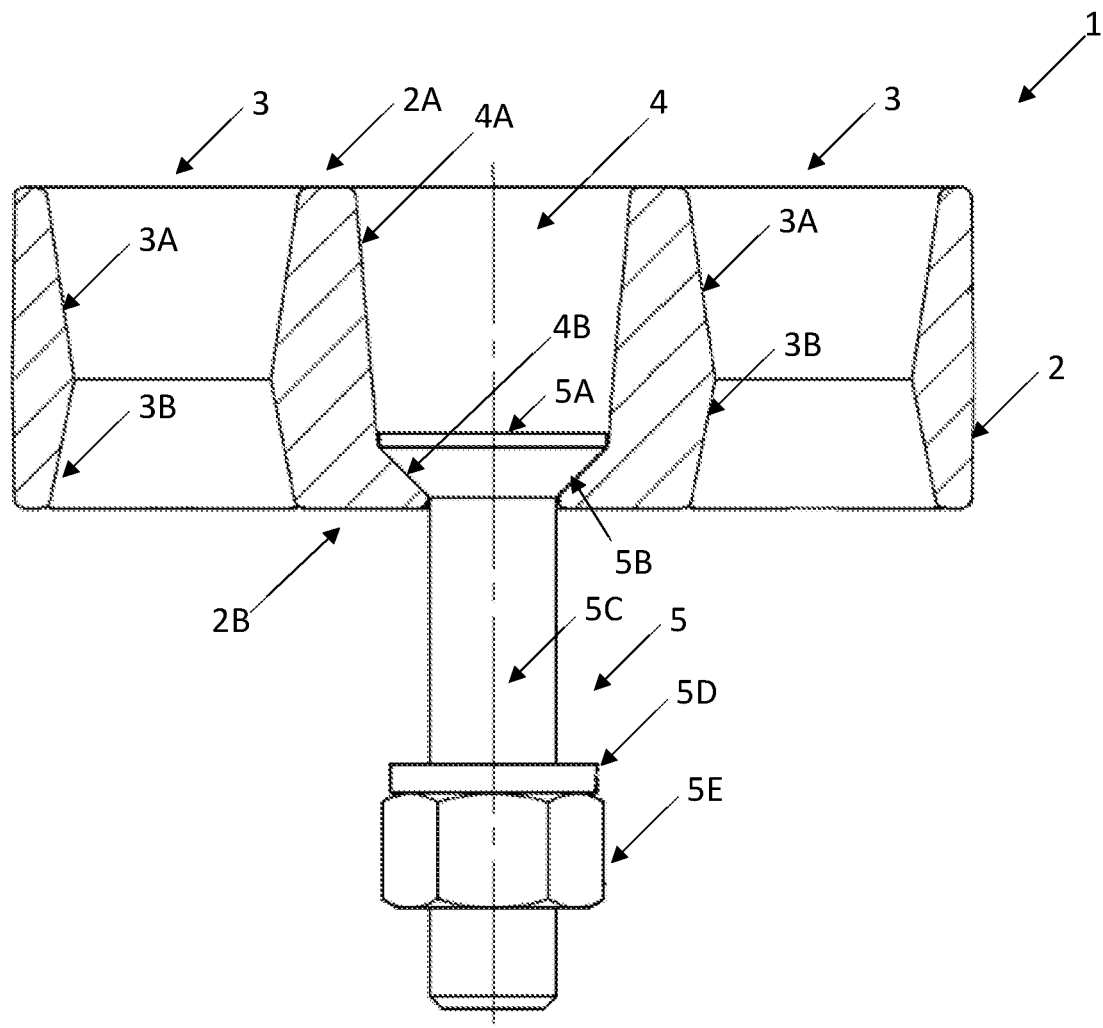
FIG. 4 is a side cross-sectional view of the wear panel 1 illustrated in FIG. 3.

FIGS. 3 and 4 show a wear panel 1 having a matrix 2 forming some or all of the wear-preventing substrate material. The matrix 2 is preferably formed from a wear-resistant material such as metal. In some preferred embodiments, the matrix 2 may be comprised of a resilient metal such as steel. The steel may comprise carbide steel, high carbon steel, manganese, hi-chrome steel, tool steel, cermet, or steel comprising carbide such as tungsten carbide alloy.

It is anticipated that for less demanding applications, the matrix 2 may be comprised of a hard polymer such as PEEK, polyethylene (e.g., HDPE, UHMWPE), polyester (PET), Nylon plastic, fiberglass, or rubber, without limitation.

The matrix 2 can be comprised of one material or a mix of materials (i.e., a composite or alloy).

The matrix 2 has a top surface 2A and a bottom surface 2B. The bottom surface 2B is opposite the top surface 2A. The matrix 2 may be uniform and homogenous across its vertical protective thickness (e.g., solid plate), but as shown, embodiments may have one or more cavities 3, 7 defined by a number of cavity walls. In some embodiments a cavity may comprise a through cavity 3. In some embodiments a cavity may comprise a blind cavity 7. If employed, the number of cavities 3, 7 provided to matrix 2 may vary.

In some embodiments a through cavity 3 may be provided to the matrix 2 and may comprise an upper taper 3A widening toward the top surface 21 and/or a lower taper 3B widening toward the bottom surface 2B, without limitation. In some embodiments, a blind cavity 7 may be provided to the top surface 2A of the matrix 2 as a top surface blind cavity 7A. In some embodiments, a blind cavity 7 may be provided to the bottom surface 2B of the matrix 2 as a bottom surface blind cavity 7B. Such a top surface blind cavity 7A may optionally widen towards the top surface 2A of the matrix 2. The bottom surface blind cavity 7B may optionally widen towards the bottom surface 2B.

It should be understood that a cavity 3, 7, where described herein, can be tapered or straight-walled (i.e., uniform in cross section in one or more axes), without limitation. Moreover, it should be understood that a cavity 3, 7, where described herein, can have any cross-sectional shape, including, but not limited to, circular, polygonal, or a polygon having one or more arcuate sides, without limitation. As can be gleaned from the drawings, rounding/fillets and or chamfering may be provided to edge, corner, or boundary portions of the matrix 2 proximate cavities 3, 7, without limitation.

For example, as illustrated, cavities 3, 7 may be generally triangular in cross-section, generally rectangular/square in cross-section, and/or hourglass-shaped in cross-section, without limitation. In some embodiments, surface portions of cavities may be frusto-pyramidal or "truncated pyramid" in shape. Such pyramids may be rectangular (i.e., 4-sided) pyramids or triangular (i.e., 3-sided) pyramids, without limitation. Other cavity 3, 7 shapes (e.g., pentagonal, hexagonal, octagonal, etc.) that pack nicely across the top 2A and/or bottom 2B surfaces of the matrix 2 may be employed, without limitation.

Through cavities 3 may extend through both the top surface 2A and the bottom surface 2B of the matrix 2, without limitation. Blind cavities 7, 7A, 7B when provided to matrix 2, may not extend through both top 2A and bottom 2B surfaces. In some embodiments, walls or inner surface portions of cavities 3, 7 may be tapered. For example, in a side plan (vertical) cross-sectional view (e.g., as seen in FIGS. 4-6, 14, and 15, the cavities 3, 7 and/or their cavity walls can increase or decrease in width throughout their depth/thickness of the matrix 2. In a (horizontal) top cross-sectional view (e.g., top plan (horizontal) view as in FIGS. 3 and 13), one or more of the cavities 3, 7 can be substantially rectangular or triangular, without limitation. In other embodiments, in a top plan (horizontal) cross-sectional view (e.g., as in FIGS. 3 and 13), one or more of the cavities 3, 7 and cavity walls can take on other shapes, for example, a circle, a triangle, a quadrilateral, a pentagon, a hexagon, an irregular hexagon, a polygon, without limitation.

Cavity walls which define each side or inner surface portion of the at least one cavity 3, 7 may be textured for better bonding with a polymeric substance received within the at least one cavity 3, 7. In some embodiments, a polymeric substance, such as a urethane, may be provided within some or all of the cavities 3, 7, without limitation. It is anticipated that various combinations of shapes and sizes of cavities 3, 7 may be employed within a matrix 2 without departing from the scope and spirit of the inventive concept.

Figure 5:
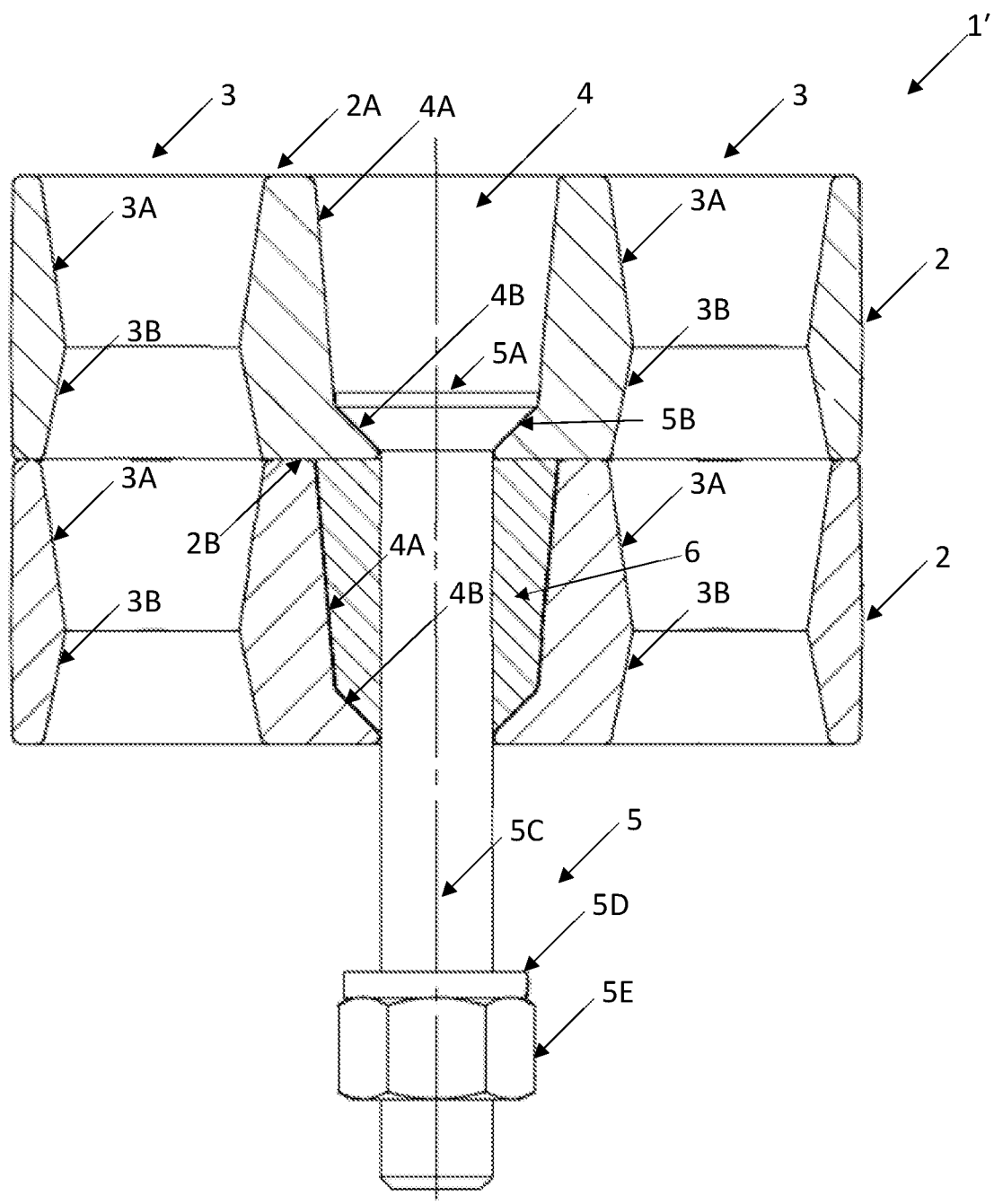
FIG. 5 is a side cross-sectional view of a dual-stacked wear panel 1' according to non-limiting embodiments of the invention.
Figure 6:
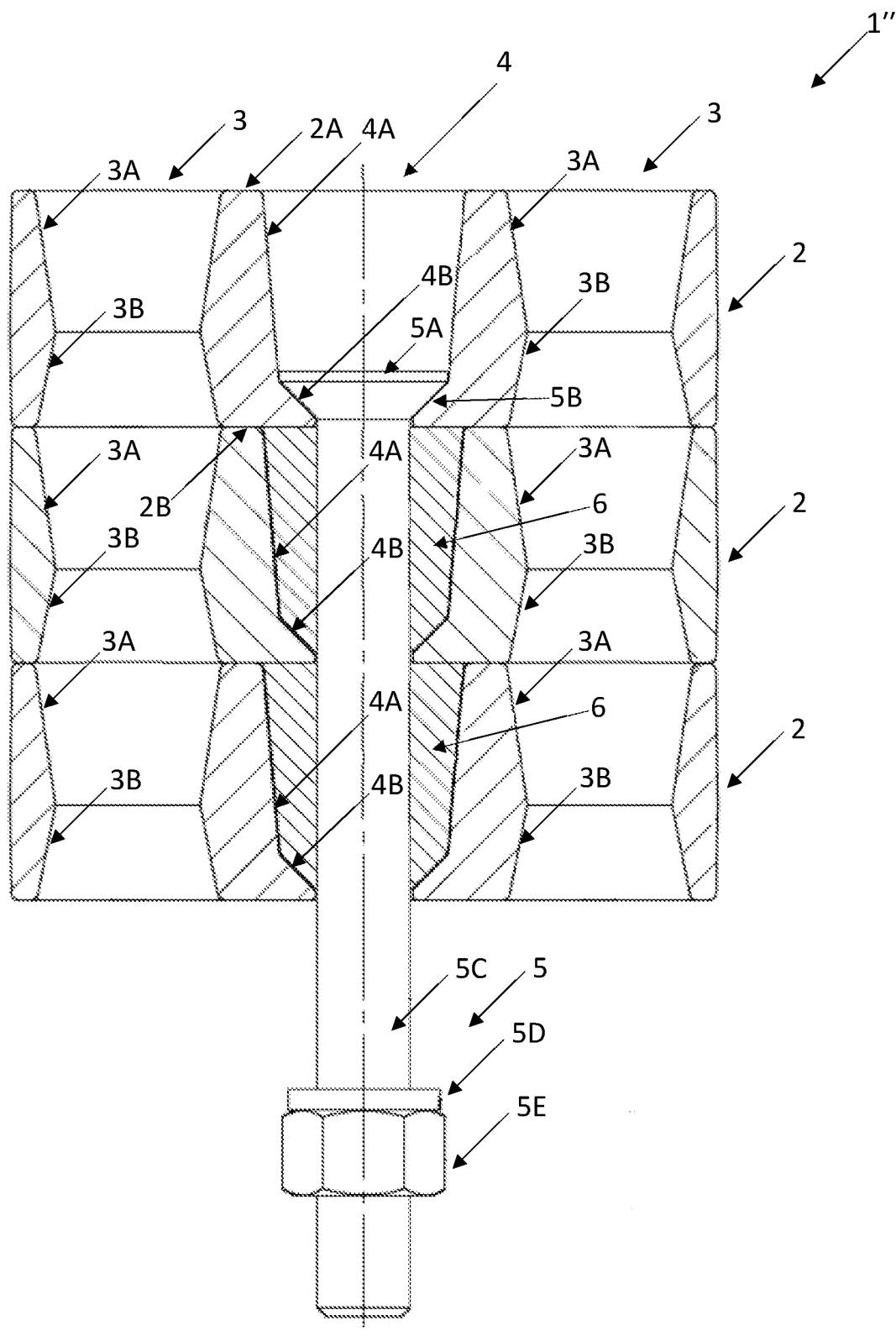
FIG. 6 is a side cross-sectional view of a tri-stacked wear panel 1" according to non-limiting embodiments of the invention.

As clearly shown in e.g. FIGS. 4-6, in a side plan (vertical) cross sectional view cavities 3, 7 provided to matrix 2 may decrease in width as they approach a central region of the matrix 2, and may increase in width as they approach the top surface 2A and bottom surface 2B of the matrix 2, thereby forming an hourglass-shaped cross-sectional profile in a side plan (vertical) cross-sectional view. However, it is envisaged that while not shown, a cavity (e.g., one or more through cavities 3) provided to the matrix 2 may alternatively comprise cavity walls defining a single taper extending between top surface 2A and bottom surface 2B (e.g., wherein a width between the cavity walls gradually increases or decreases in only one direction extending between top surface 2A and bottom surface 2B, thereby forming a trapezoidal-shaped cross-section in side plan (vertical) cross-sectional view).

In some embodiments, cavity walls defining inner surfaces of cavities 3, 7 can be varying widths throughout their depth. In some embodiments, one, some, or all of the cavities 3, 7 may comprise cavity walls which are spaced substantially the same along a direction extending between top surface 2A and bottom surface 2B (i.e., non-tapered cavity walls). Horizontal cross-sectional shapes, sizes, and/or cross-sectional widths may vary between cavities 3, 7—or may be substantially the same or shared between cavities 3, 7 in the matrix 2, without limitation. In some embodiments, some or all of the cavities 4 and cavity walls 5 may be different (e.g. —having different cross-sectional shapes and/or sizes in at least one of a side plan (vertical) cross-sectional view or top plan (horizontal) cross-sectional view), without limitation.

Turning now to FIG. 3, a wear panel 1 may, in addition to one or more optional cavities 3, 7, 7A, 7B, be provided with a central bore 4. The central bore 4 may be configured to receive a bolt 5 therein and/or therethrough, without limitation. As demonstrated in the particular embodiment shown, the central bore 4 may comprise an upper taper 4a that extends from the top surface 2A of the matrix towards the bottom surface 2B. The upper taper 4A may be minimal, for example greater than 0 degrees, and less than 30 degrees, such as approximately 5-20 degrees with respect to an axis of central bore 4, without limitation. The central bore 4 may comprise a lower taper 4B as shown to serve as a tapered bottoming surface for a lower head surface 5B of a head 5A of a bolt 5. Alternatively, the lower taper 4b may serve as a tapered bottoming surface for a lower taper 6E of a stacking adapter 6 as will be apparent from FIGS. 4 and 5. The lower taper 4B may comprise a self-centering frustospherical or frustoconical surface, without limitation. The lower taper 4B may be provided in the form of a shelf portion or radially-inwardly projecting flange, without limitation.

Figure 1:
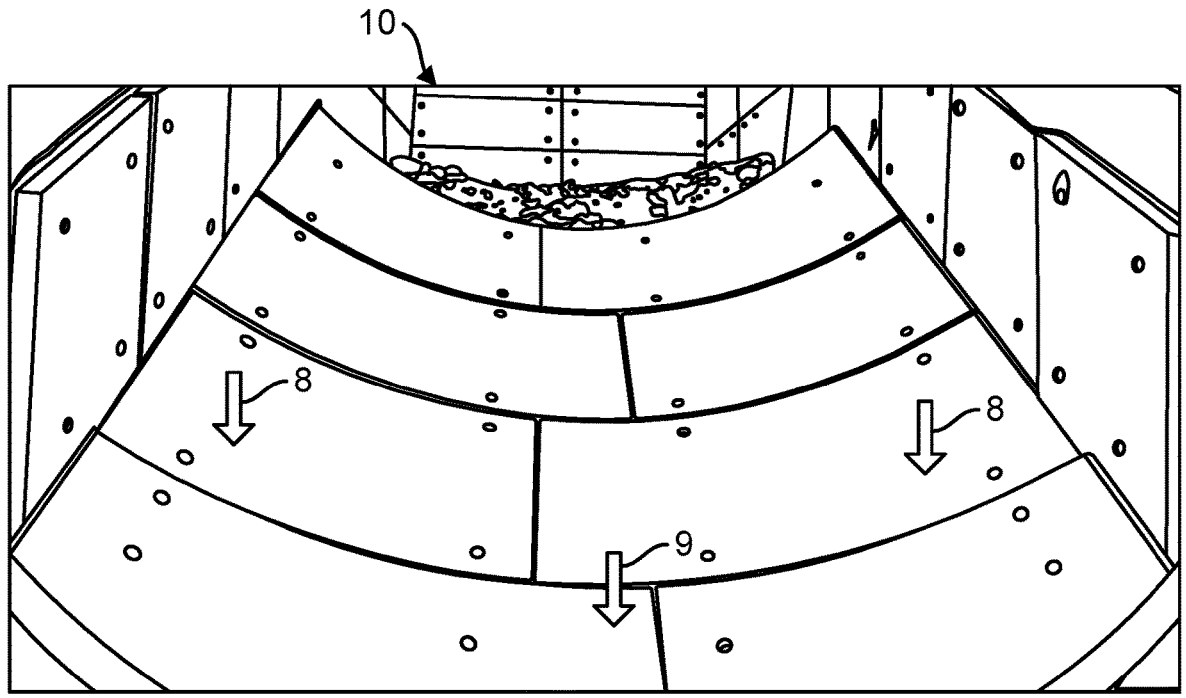
FIGS. 1 and 2 are representative photographs illustrating a problem associated with concentrated wear patterns in equipment 10.
Figure 2:
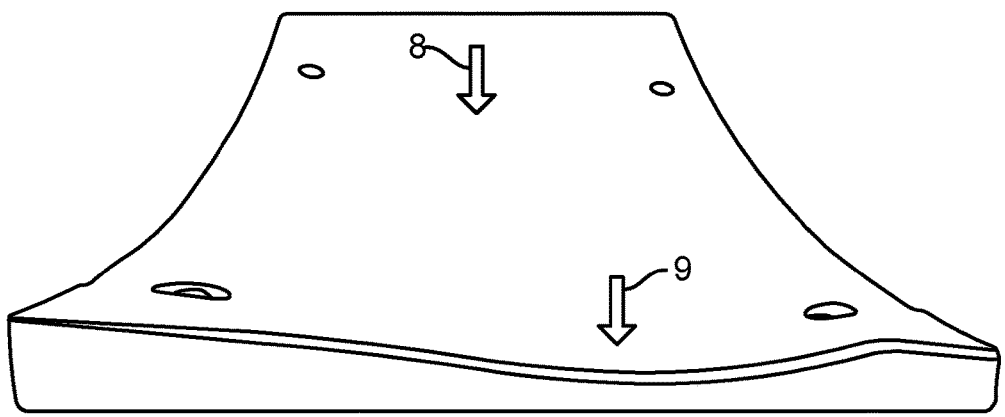
Figure 7:
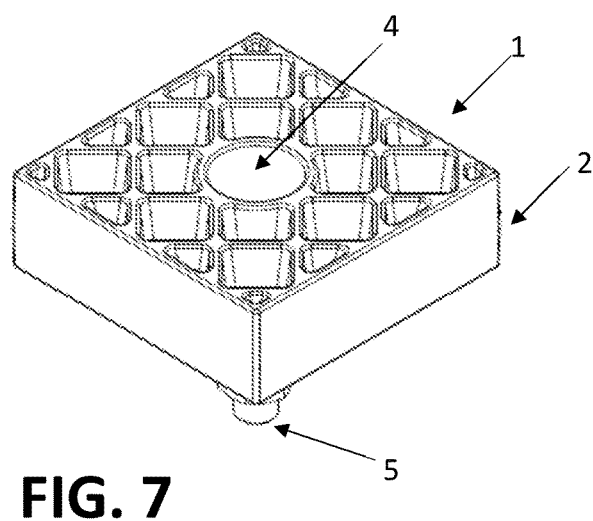
FIG. 7 is an isometric view of the wear panel shown in FIGS. 3 and 4.

For installation of a single-stacked wear panel 1, as shown in FIGS. 1 and 7, a bolt may be placed within central bore 4 and its outer threaded shaft 5C extended through bottom surface 2B of matrix 2. The outer threaded shaft 5C may then pass through a wall 10A of a piece of equipment 10, wherein a washer or lock ring 5D and nut 5E can be used to secure the matrix 2 to the wall 10A by tightening the bolt 5 and nut 5E via a torque application structure 5F. By virtue of the lower head surface 5B of a head 5A of the bolt applying pressure to the lower taper 4B of central bore 4, the bottom surface 2B of the matrix 2 is pressed against wall 10A.

Figure 8:
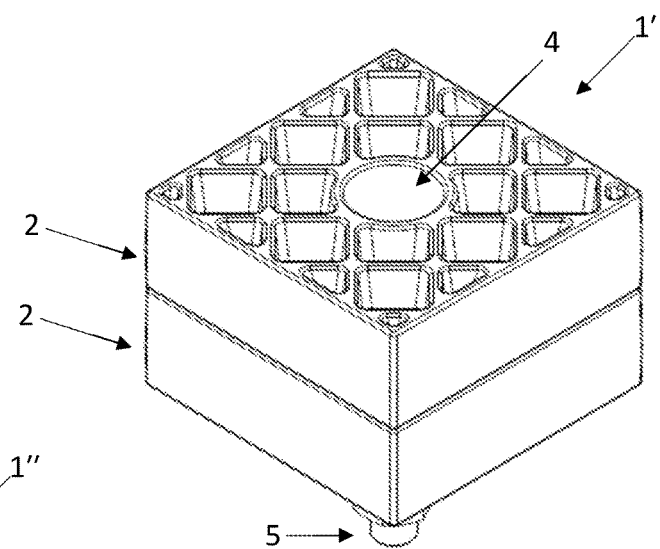
FIG. 8 is an isometric view of the dual-stacked wear panel 1' shown in FIG. 5.
Figure 17:
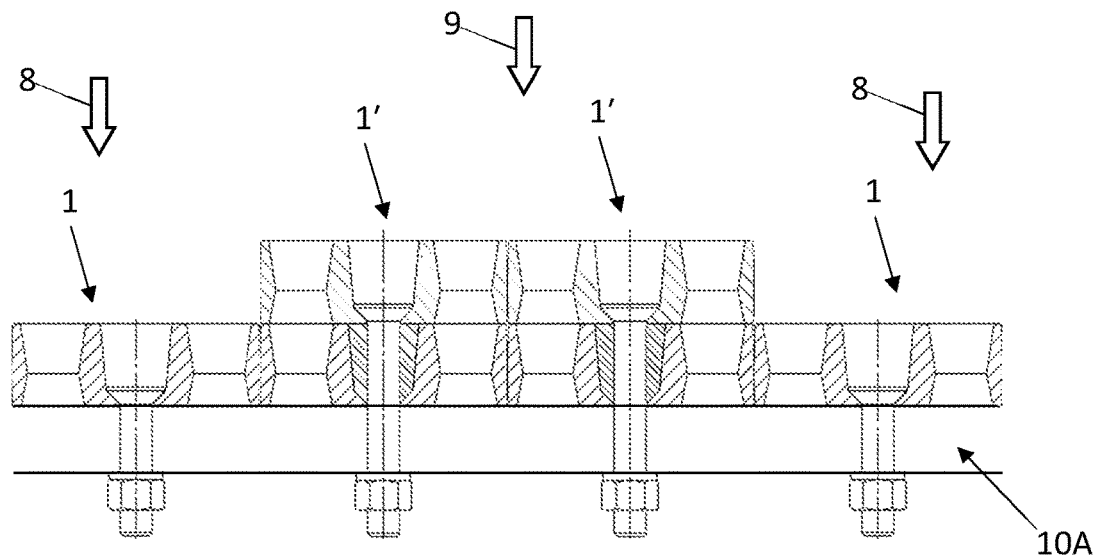
FIG. 17 suggests one non-limiting configuration of a modular stackable wear-resistant panel system according to some embodiments of the invention. The particular configuration shown incorporates both single layer wear panels 1 and dual-stacked 1' wear panels 1, without limitation.

Turning now to FIGS. 5, 8, and 17, portions of a wall 10A may be provided with a dual-stacked wear panel 1'. The dual-stacked wear panel 1' comprises a second matrix 2 stacked upon a first matrix 2, such that a bottom surface 2B of the first matrix is proximate the wall 10A, a top surface 2A of the first matrix 2 lies adjacent a bottom surface 2B of the second matrix, and the top surface 2A of the second matrix is exposed to abrasive material processed by equipment 10 comprising the wall 10A. A lower head surface 5B of a head 5A of a bolt 5 engages the lower taper 4B of the second matrix 2, and the outer threaded shaft 5C of the bolt 5 passes through an aperture 6B and engages an inner thread 6C of a stacking adapter 6 provided within the central bore 4 of the first matrix 1 provided adjacent the wall 10A. Fasteners 5 of different lengths may be provided within the system 11. The outer threaded shaft 5C of each fastener 5 may comprise a fully threaded shaft, without limitation.

The stacking adapter 6, as suggested in FIGS. 10-12, may be shaped and sized so as to be complimentarily received within the central bore 4 of the first matrix 1. The stacking adapter 6 may comprise an upper taper 6D on its outer peripheral surface which closely matches or approximates the upper taper 4A of central bore 4, without limitation. The stacking adapter 6 may comprise a lower taper 6E on its outer peripheral surface which closely matches or approximates the lower taper 4B of central bore 4, without limitation. The stacking adapter 6 may comprise a height, width, shape, and/or size which closely approximates that of the central bore 4. A wider top surface 6A of the stacking adapter 6 is thus provided adjacent the top surface 2A of the first matrix 2 and bottom surface 2B of the second matrix 2. A narrower bottom surface 6F of the stacking adapter 6 is thus provided adjacent the wall 10A and the bottom surface 2B of the first matrix 2.

Figure 9:
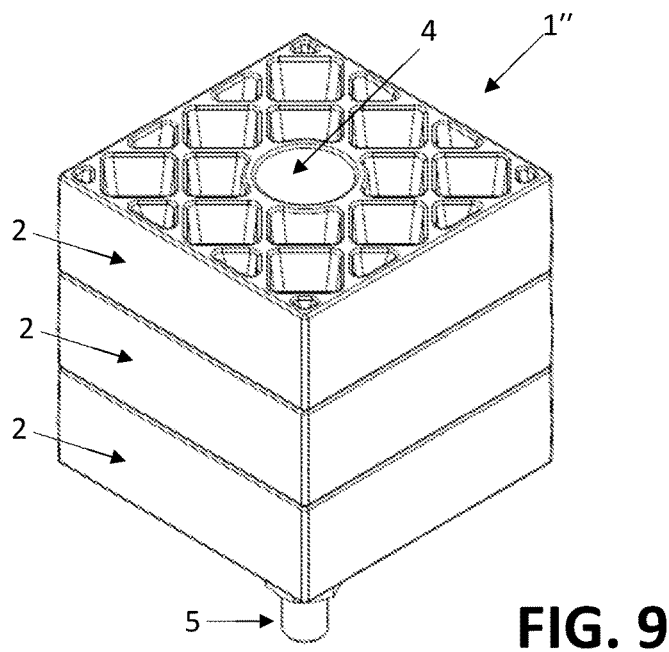
FIG. 9 is an isometric view of the tri-stacked wear panel 1' shown in FIG. 6.
Figure 13:
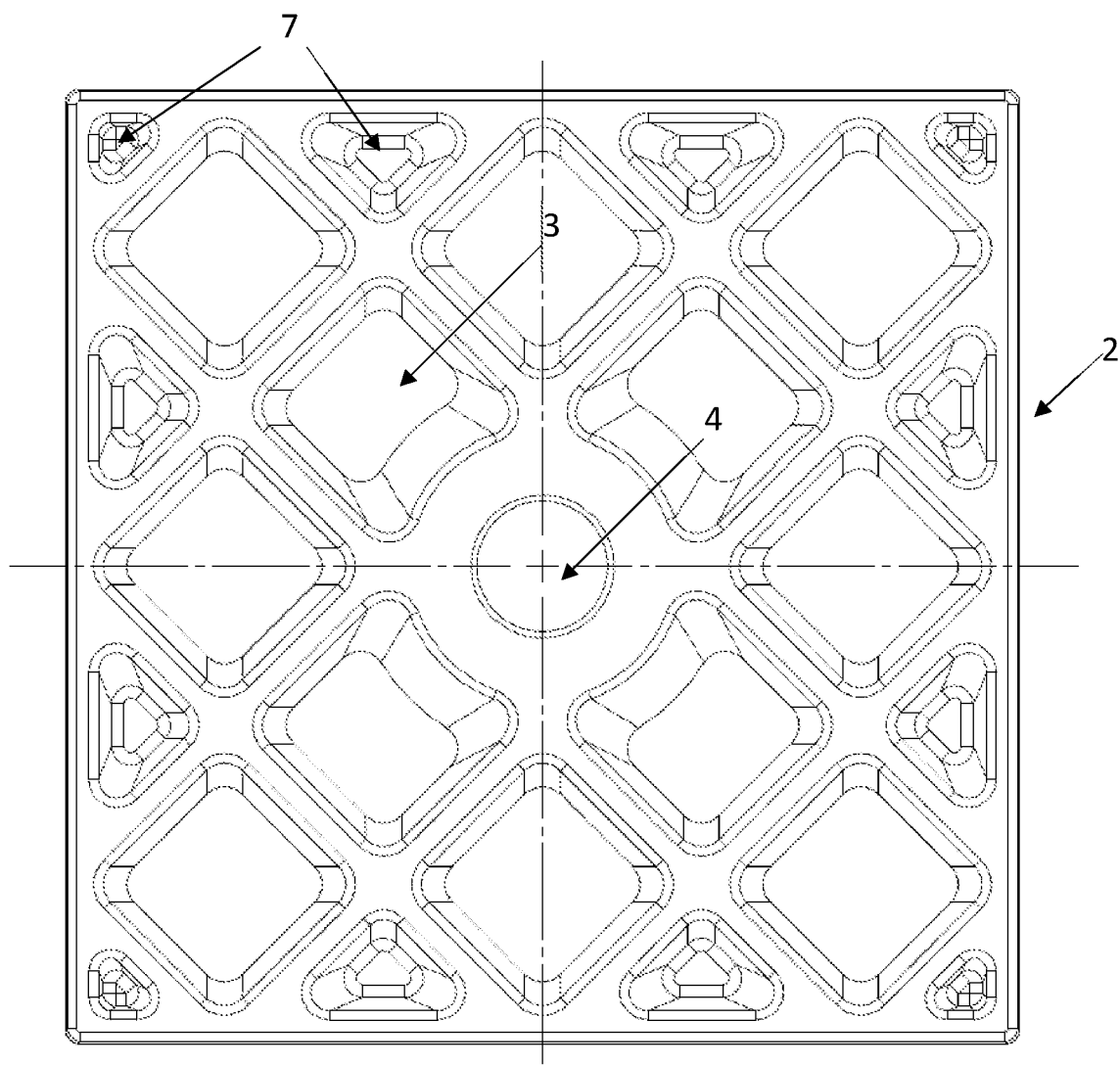
FIG. 13 is a top plan view of a matrix 2 of a wear panel 1 in accordance with some non-limiting embodiments of the invention.
Figure 14:
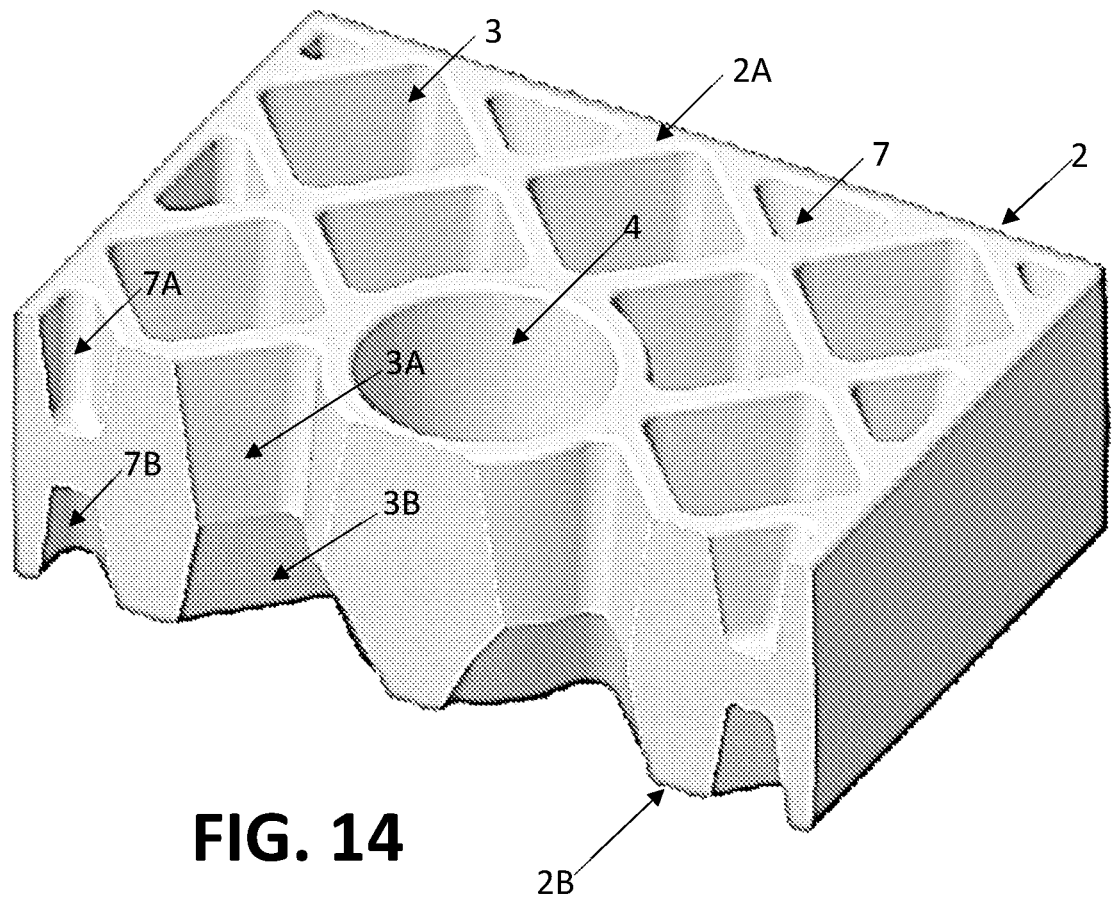
FIGS. 14 and 15 are two different isometric cross-sectional views of a wear panel matrix 2 according to some non-limiting embodiments of the invention.
Figure 15:
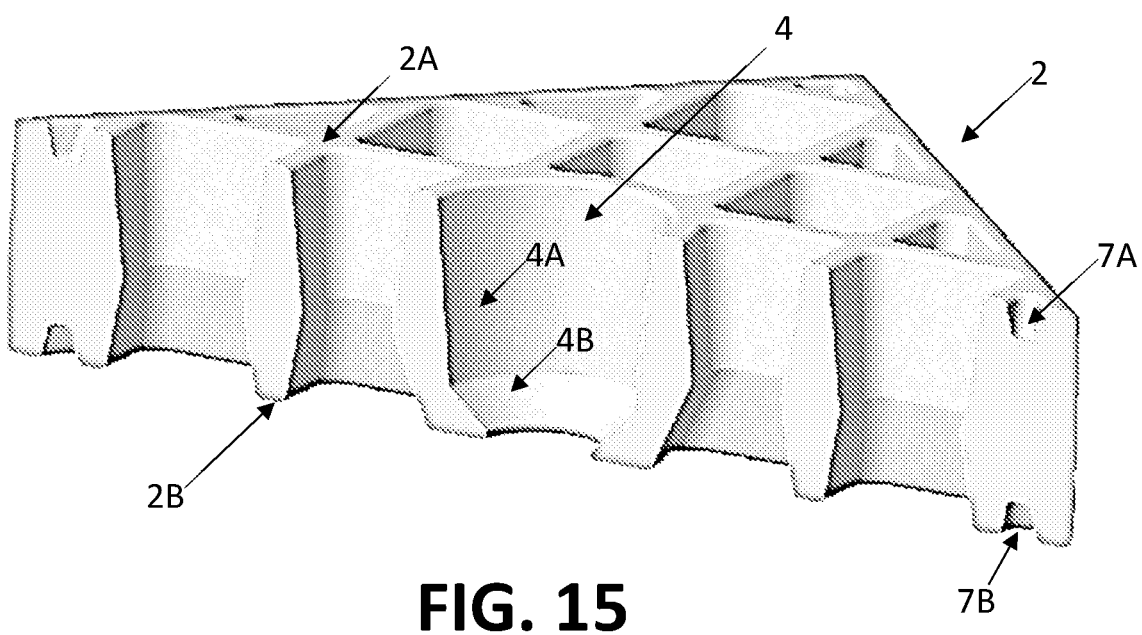
Figure 16:
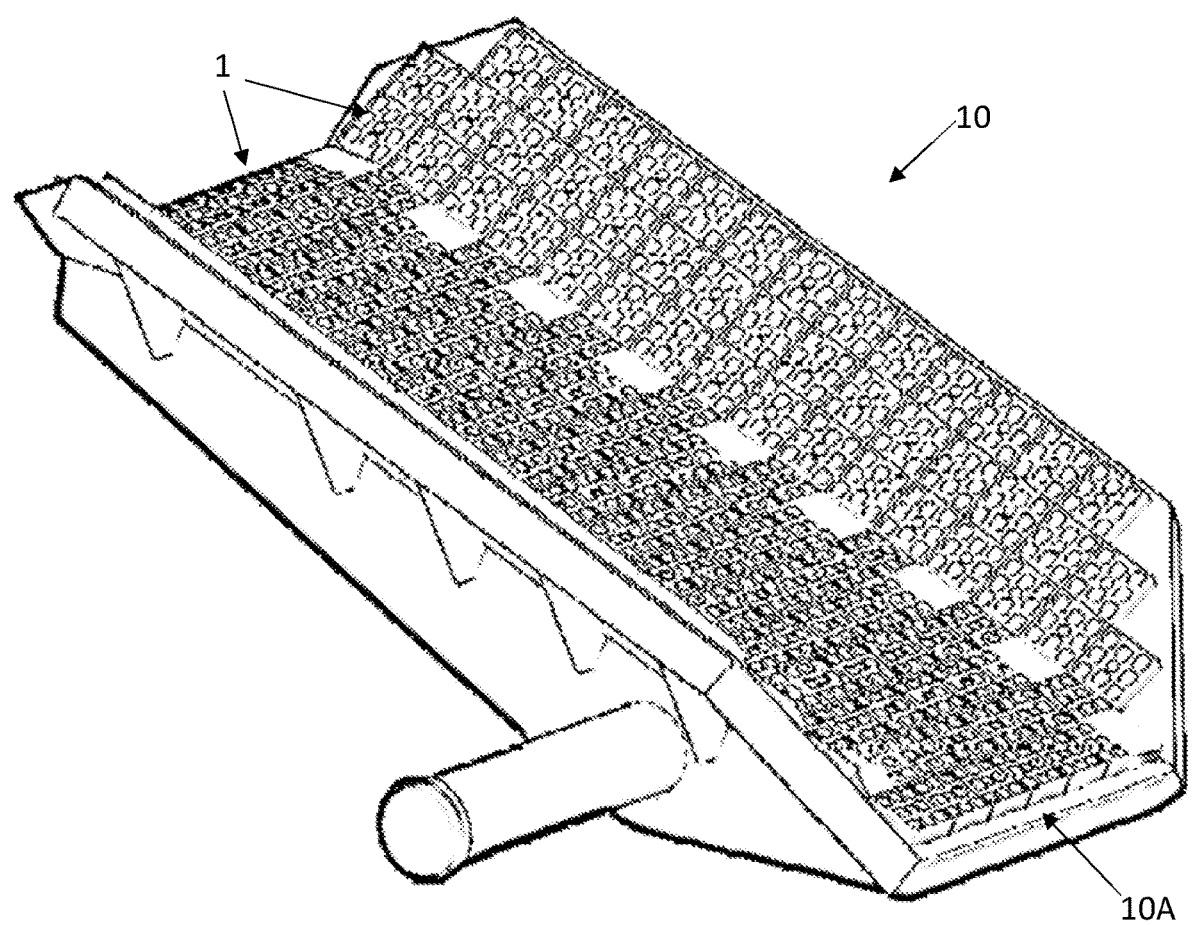
FIG. 16 suggest one non-limiting exemplary use of wear panels 1 and stacked wear panels 1', 1" on equipment 10 according to some non-limiting embodiments of the invention.
Figure 18:
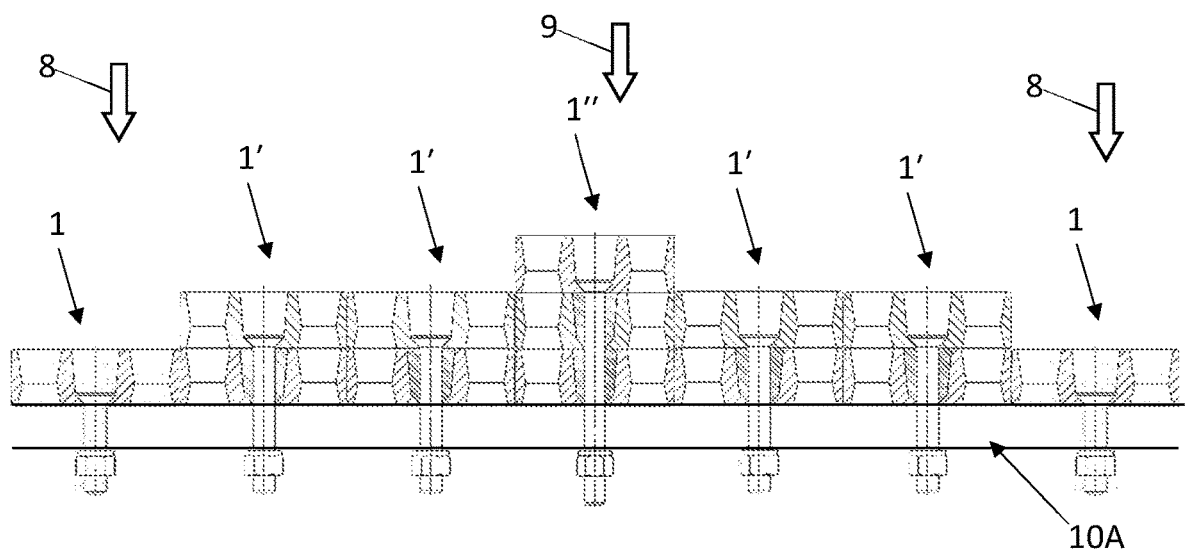
FIG. 18 suggests another non-limiting configuration of a modular stackable wear-resistant panel system which demonstrates that combinations of dual- 1', tri-stacked 1" and/or single-layer wear panels 1 may be applied to a wall 10A of a piece of equipment 10 according to some embodiments of the invention.
Figure 19:
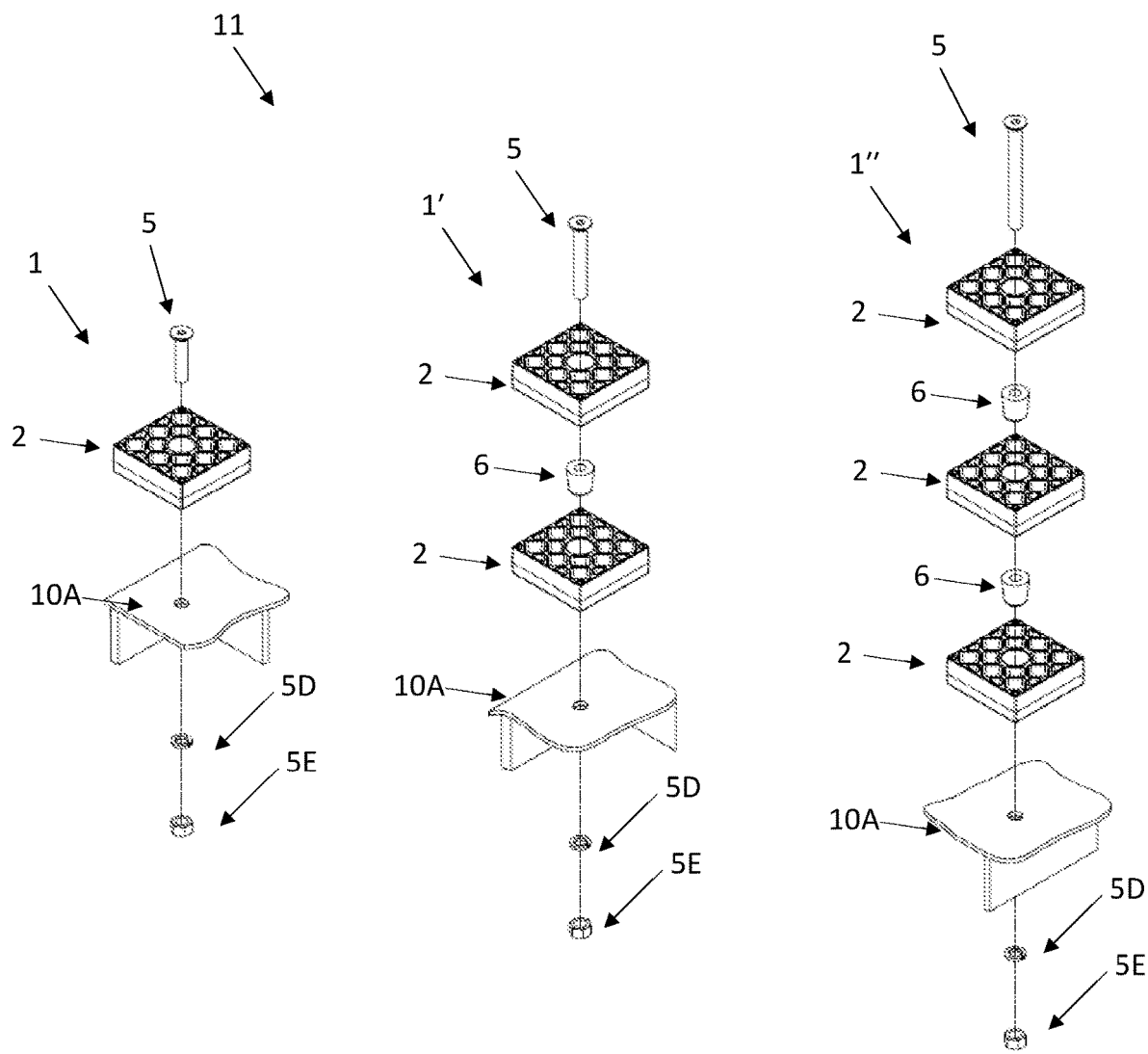
FIG. 19 suggests a modular stackable wear-resistant panel system 11, and how a single-, dual-, or tri-stacked panel 1, 1', 1" may be provided to a wall 10A of equipment 10. As shown, fasteners 5 within the system 11 may comprise different lengths, without limitation.

Turning now to FIGS. 6, 9, and 18, portions of a wall 10A may be provided with a tri-stacked wear panel 1", wherein three identical matrix 2 are vertically stacked on top of each other in a side plan (vertical) cross-sectional view. The tri-stacked wear panel 1A" is advantageously configured such that the central bore 4 of each matrix 2 can be concentrically aligned, and such that a single bolt 4 can be used to secure all three matrix 2 to a wall 10A of equipment 10 via the use of two stacking adapters 6.

In this regard, a first matrix 2 provided with a spacing adapter 6 in its central bore 4 may be positioned with its bottom surface 2B adjacent the wall 10A, a second matrix 2 provided with a spacing adapter 6 in its central bore 4 may be provided on top of the first matrix 2, and a third matrix 2 may be provided on top of the second matrix 2. A single bolt 5 may be inserted through the central bore 4 of the third matrix 2, wherein its outer threaded shaft 5C engages inner threads 6C of each stacking adapter 6, passes through wall 10A, and engages a nut 5E. An optional washer or locking ring 5D may be provided between the nut 5E and wall 10A.

Embodiments of the present invention may demonstrate advantageous utility by providing dual- 1' or tri-stacked 1" wear panels in areas 9 of equipment 10 that are more prone to higher wear, and/or economically providing single-stacked wear panels 1 to areas 8 of equipment 10 which are less prone to experiencing wear from material processed by the equipment. For example, as demonstrated in FIGS. 17 and 18, a greater number of wear panel matrices 2 may be stacked proximate areas 9 of a wall 10A that experience higher wear, and a lesser number of wear panel matrices 2 may be provided proximate areas 8 of a wall 10A that experience less wear.

As wear panels 1, 1', 1" experience wear due to exposure to abrasive flows of material, select matrices 2 which are worn may be left alone to erode away (with no detrimental effect or loosening of underlying wear panel matrices 2 due to spacing adapters); or, they may be removed and replaced with a new matrix 2 as needed for proper functioning of equipment 10 and protection of wall 10A. Even upon the complete destruction of the head 5A of bolt 5 due to erosive wear, spacing adapters 6 remain threadedly engaged with respective portions of outer threaded shaft 5C, thus retaining the securing functionality and integrity of bolt 5.

The modularity of the modular stackable wear-resistant panel system 11 may allow a user to increase periods between routine maintenance, shorten the duration of maintenance cycle downtime, customize wear solution configurations, and/or eliminate or reduce operators to hazards due to the small and maneuverable ergonomic sizing and shape of the wear panels 1, 1', 1".

The particular configurations shown in FIGS. 17 and 18 may inherently allow a splitting of feeds and/or flows of abrasive material into a plurality of distinct paths, rather than a single central channel, thus further minimizing local wear by more evenly spreading and wear and more effectively distributing wear patterns more uniformly across a wall 10A of equipment. This, capability, in itself, may serve to extend wear life expectancy of components within the modular stackable wear-resistant liner system 11. Thus, the modularity of the disclosed modular stackable wear-resistant wear panel system 11 offers incredible versatility and a multitude of unique and customizable configurations which can provide optimized functionally-graded wear lining solutions that are practical for a number of different industrial applications.

In some preferred embodiments, a single, unstacked wear panel 1 may measure approximately 300 mm×300 mm, for example, within a range of (150 mm-500 mm)×(150 mm-500 mm), without limitation. In other embodiments, it is anticipated that a matrix 2 may measure 150 mm×150 mm. In other embodiments, the wear panel 1 may be substantially larger than 300 mm×300 mm. It is preferable that each wear panel 1 weigh an amount less than 50 lbs. to provide an ergonomically-sustainable and safe wear lining system solution that reduces pinch point hazards and that does not require the use of lifts, hoists, jigs, chains, or heavy machinery for installation and removal from equipment 10.

The wear panels 1 described and illustrated herein are provided merely as examples of a wear panel 1 to which the invention of the claims may be applied. The specification does not suggest that the invention of the claims is limited to or applies only to the wear panel 1 shown and described herein.

In this specification, adjectives such as first and second, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

LIST OF REFERENCE IDENTIFIERS

1 Wear panel
1' Dual-stacked wear panel
1" Tri-stacked wear panel
2 Matrix
2A Top surface (Matrix)
2B Bottom surface (Matrix)
3 Through cavity (Matrix)
3A Upper tapered surface (Cavity)
3B Lower tapered surface (Cavity)
4 Central bore (Matrix)
4A Upper taper (Central bore)
4B Lower taper (e.g., tapered bottoming surface for head 5A, frustoconical surface, shelf portion, radially-inwardly projecting flange)

5 Bolt
5A Head (Bolt)
5B Lower head surface (e.g., taper, frustroconical surface)
5C Outer threaded shaft (Bolt)
5D Washer or lock ring
5E Nut
5F Torque application structure (Bolt)
6 Stacking adapter
6A Wider top surface (Stacking adapter)
6B Aperture (Stacking adapter)
6C Inner thread (Aperture)
6D Upper taper (Stacking adapter)
6E Lower taper (Stacking adapter)
6F Narrower bottom surface (Stacking adapter)
7 Blind cavity (Matrix)
7A Top surface blind cavity (e.g., tapered)
7B Bottom surface blind cavity (e.g., tapered)
8 Area prone to less wear
9 Area prone to higher wear
10 Equipment
10A Wall
11 Modular stackable wear-resistant panel system

What is claimed is:

1. A modular stackable wear-resistant panel system (11), comprising a stacked wear panel arrangement (1', 1") including a stackable wear panel (1), the stackable wear panel (1) being configured to be removably affixed to a wall (10A) or surface of equipment (10) to be protected—and also configured to be alternatively removably affixed to a top surface (2A) of another stackable wear panel (1) within the stacked wear panel arrangement (1', 1"), the stackable wear panel (1) comprising:
   a matrix (2) having a top surface (2A), a bottom surface (2B) opposite said top surface (2), and a central bore (4) extending through the top (2A) and bottom (2B) surfaces and receiving a fastener (5) or a spacing adapter (6) therein, the central bore (4) being configured to support a portion (5A, 5B) of the fastener (5) or a lower outer surface portion (6E) of the spacing adapter (6);
   the stacked wear panel arrangement (1',1") comprising:
   a fastener (5);
   a spacing adapter (6);
   a first matrix (2); and
   a second matrix (2) substantially identical to the first matrix (2),
   the first matrix (2) being configured to be removably affixed to the wall (10A) or surface of equipment (10) to be protected, and comprising a first central bore (4) having the spacing adapter (6) disposed therein,
   a bottom surface (2B) of the second matrix (2) being positioned against a top surface (2A) of the first matrix (2),
   the second matrix (2) comprising a second central bore (4) having a head (5A) of the fastener (5) therein;
   wherein the spacing adapter (6) comprises an aperture (6B) extending completely through the spacing adapter (6) and comprising an inner thread (6C), the inner thread (6C) being configured for threaded engagement with an outer threaded shaft (6C) of the fastener (5); the fastener (5) passing entirely through the spacing adapter (6).

2. The modular stackable wear-resistant panel system (11) according to claim 1, wherein the fastener (5) is a bolt (5) comprising the head (5A).

3. The modular stackable wear-resistant panel system (11) according to claim 1, wherein a lower outer surface portion (6E) of the spacing adapter (6) comprises a tapered surface, a rounded surface, or a chamfer which is configured to bias the spacing adapter (6) into coaxial alignment with the central bore (4).

4. The modular stackable wear-resistant panel system (11) according to claim 1, wherein the fastener (5) is configured for threaded engagement with a nut (5E) provided to a back side of the wall (10A) or surface of equipment to be protected.

5. The modular stackable wear-resistant panel system (11) according to claim 1, wherein the first and second matrix (2) comprise a number of cavities (3, 7).

6. The modular stackable wear-resistant panel system (11) according to claim 5, wherein the number of cavities (3, 7) comprises a number of through-cavities (3) extending through the top surface (2A) and the bottom surface (2B) of the first and second matrix (2).

7. The modular stackable wear-resistant panel system (11) according to claim 5, wherein the number of cavities (3, 7) comprises a number of blind-cavities (7, 7A, 7B) extending into the top surface (2A) of the first and second matrix (2) and/or bottom surface (2B) of the first and second matrix (2).

8. The modular stackable wear-resistant panel system (11) according to claim 5, wherein the number of cavities (3, 7) comprises a taper (3A, 3B).

9. The modular stackable wear-resistant panel system (11) according to claim 5, wherein the number of cavities (3, 7, 7A, 7B) comprise or are filled with a polymer.

10. The modular stackable wear-resistant panel system (11) according to claim 9, wherein the polymer comprises urethane or hard rubber.

11. A method of installing a stackable wear panel (1) onto a wall (10A) or surface of a piece of equipment (10), the stackable wear panel (1) being part of a modular stackable wear-resistant panel system (11), the method comprising the steps of:
   providing a first matrix (2) having a top surface (2A), a bottom surface (2B) opposite said top surface (2A), and a central bore (4) extending through the top (2A) and bottom (2B) surfaces and for receiving a fastener (5) or a spacing adapter (6) therein, the central bore (4) being configured to support a portion (5A, 5B) of the fastener (5) or lower outer surface portion (6E) of the spacing adapter (6);
   inserting the fastener (5) through the central bore (4) of the first matrix (2);
   supporting the fastener (5) within the central bore (4) such that the portion of the fastener (5) engages a surface portion of the central bore (4);
   preventing further passage of the fastener (5) beyond the lower surface (2B) of the first matrix (2) using the central bore (4);
   applying a nut (5E) to an outer threaded shaft (5C) of the fastener (5); and,
   securing the first matrix (2) against relative movement with respect to the wall (10A) or surface of a piece of equipment (10) by virtue of tightening the nut (5E) in relation to the outer threaded shaft (5C) of the fastener (5);
   providing a second matrix (2) which is substantially identical to the first matrix (2) and also having a top surface (2A), a bottom surface (2B) opposite said top surface (2A), and a central bore (4) extending through the top (2A) and bottom (2B) surfaces and for receiving a fastener (5) or a spacing adapter (6) therein, the central bore (4) being configured to support a portion (5A, 5B) of the fastener (5) or a lower outer surface portion (6E) of the spacing adapter (6);

arranging said second matrix (2) below said first matrix (2), such that the bottom surface (2B) of said first matrix (2) is in close proximity with the top surface (2A) of the second matrix (2);

providing the spacing adapter (6) within the central bore (4) of the second matrix (2), the spacing adapter (6) having an aperture (6B) extending completely through the spacing adapter (6) and outfitted with an inner thread (6C); and;

engaging the inner thread (6C) with the outer threaded shaft (5C) of the fastener (5) and passing the fastener (5) entirely through the aperture (6B) prior to the step of applying a nut (5E) to an outer threaded shaft (5C) of the fastener (5).

\* \* \* \* \*